US011668351B2

(12) United States Patent
Burgess (10) Patent No.: US 11,668,351 B2
(45) Date of Patent: Jun. 6, 2023

(54) SAFETY GUARD SUPPORT FOR POWER TAKE OFF JOINTS AND SHAFTS (71) Applicant: Sparex Limited, Exeter (GB)

(72) Inventor: Jeremy Burgess, Rugby (GB)

(73) Assignee: Sparex Limited, Exeter (GB)

( * ) Notice: Subject to any disclaimer, the term of this patent is extended or adjusted under 35 U.S.C. 154(b) by 425 days.

(21) Appl. No.: 16/955,761

(22) PCT Filed: Oct. 26, 2018

(86) PCT No.: PCT/EP2018/079428
§ 371 (c)(1),
(2) Date: Jun. 18, 2020

(87) PCT Pub. No.: WO2019/120710
PCT Pub. Date: Jun. 27, 2019

(65) Prior Publication Data
US 2021/0071719 A1 Mar. 11, 2021

(30) Foreign Application Priority Data
Dec. 22, 2017 (GB) ...................................... 1721801

(51) Int. Cl.
*F16D 3/84* (2006.01)
*F16B 21/18* (2006.01)
*A01B 71/08* (2006.01)
(52) U.S. Cl.
CPC ............ *F16D 3/841* (2013.01); *F16B 21/186* (2013.01); *A01B 71/08* (2013.01)
(58) Field of Classification Search
CPC ........ A01B 71/08; B60K 17/22; B60K 17/24; B60K 17/28; F16B 21/18; F16B 21/183; F16B 21/186; F16D 3/84; F16D 3/841; F16D 3/843; F16D 3/845; F16D 2003/846; F16J 3/042; F16J 3/048
USPC ............................................ 74/609; 464/175
See application file for complete search history.

(56) References Cited

U.S. PATENT DOCUMENTS 2,953,000 A * 9/1960 Ressler ................... F16D 3/841
464/178
3,044,278 A * 7/1962 Geisthoff ................ F16C 33/44
464/178
3,053,062 A * 9/1962 Geisthoff ................ A01B 71/08
464/178

(Continued)

FOREIGN PATENT DOCUMENTS

DE 3013791 A1 * 10/1980 ............. F16D 3/841
DE 3509127 A1 * 9/1986 ............. F16D 3/841

(Continued)

OTHER PUBLICATIONS

UK Intellectual Property Office, Search Report for priority Application No. GB1721801.7, dated Jun. 21, 2018.

(Continued)

*Primary Examiner* — Josh Skroupa (57) ABSTRACT

A safety guard support for a power take off shaft, the safety guard support: including a bearing; and a retainer ring. The bearing and the retainer ring including corresponding interlocking formations configured to prevent rotation of the bearing relative the retainer ring about a longitudinal axis.

20 Claims, 12 Drawing Sheets (56) References Cited

U.S. PATENT DOCUMENTS

| | | | | |
|---|---|---|---|---|
| 4,435,166 | A * | 3/1984 | Bondioli | F16D 3/841 464/901 |
| 4,568,313 | A * | 2/1986 | Diffenderfer | F16D 3/84 74/609 |
| 4,605,332 | A * | 8/1986 | Mayhew | F16D 3/848 403/50 |
| 4,747,804 | A * | 5/1988 | Benzi | F16D 3/841 464/170 |
| 5,582,547 | A * | 12/1996 | Offerhaus | F16D 3/841 464/172 |
| 6,123,622 | A * | 9/2000 | Mikeska | F16D 3/84 277/637 |
| 6,159,104 | A * | 12/2000 | Mikeska | F16D 3/841 464/170 |
| 6,203,440 | B1 * | 3/2001 | Bondioli | F16D 3/84 403/23 |
| 6,406,375 | B1 * | 6/2002 | Herchenbach | A01B 71/08 464/175 |
| 7,338,383 | B2 * | 3/2008 | Toriumi | F16D 3/84 464/175 |
| 9,470,271 | B2 * | 10/2016 | Connor | F16D 3/845 |
| 9,562,570 | B2 * | 2/2017 | Burgess | F16D 3/841 |
| 9,915,294 | B2 * | 3/2018 | Littau | F16J 3/045 |
| 10,156,268 | B2 * | 12/2018 | Cassell | F16D 3/845 |
| 2014/0228136 | A1 | 8/2014 | Daniel et al. | |
| 2015/0126292 | A1 * | 5/2015 | Aurora | F16D 3/845 464/134 |
| 2022/0325766 | A1 * | 10/2022 | House | F16D 3/841 |

FOREIGN PATENT DOCUMENTS

| | | | | |
|---|---|---|---|---|
| EP | 0 969 218 | A2 | 1/2000 | |
| EP | 2 146 107 | A2 | 1/2010 | |
| FR | 1581554 | A * | 9/1969 | F16D 3/841 |
| FR | 2334877 | A1 * | 7/1977 | F16D 3/841 |
| FR | 2451503 | A3 * | 10/1980 | F16D 3/845 |
| GB | 2116662 | A | 9/1983 | |
| GB | 2235271 | A | 2/1991 | |
| GB | 2480523 | A | 11/2011 | |
| JP | 02089819 | A * | 3/1990 | F16D 3/84 |
| JP | 2675107 | B2 * | 11/1997 | F16D 3/841 |
| WO | WO-2005077140 | A1 * | 8/2005 | A01B 71/08 |

OTHER PUBLICATIONS

European Patent Office, International Search Report for related International Application No. PCT/EP2018/079428, dated Jan. 25, 2019.

* cited by examiner

SAFETY GUARD SUPPORT FOR POWER TAKE OFF JOINTS AND SHAFTS

FIELD OF THE INVENTION

The invention relates to a safety guard support. The safety guard support is especially suited for use with a wide angle power take off joint (WAPTO) of an agricultural tractor, harvester or implement as well as standard power take off (PTO) joints. However it will be appreciated that the safety guard support may also be used to cover any other rotating shaft, rotating joint or universal joint.

TECHNICAL BACKGROUND

Safety legislation in many western jurisdictions requires that PTO shafts and their connecting members and joints are covered by a guard which reduces the risk of injury for the operator. Guards fitted to the PTO shafts of agricultural equipment are typically formed of a plastic material and comprise a tube with enlarged end portions or bellows to accommodate the coupling mechanism. To minimize wear of the plastic guard, a bearing is often fitted to the PTO shaft to support the guard and allow the shaft and guard to rotate with respect to one another. Furthermore, to prevent axial movement of the guard relative to the bearing and/or shaft, a means of securing the guard to the bearing member or shaft is often provided in the form of a releasable clip. In the case of guards for a WAPTO joint, the guard must be supported relative to the centre part of the wide angle joint.

SUMMARY OF THE INVENTION

It is an object of the invention to provide an alternative guard support mechanism for a PTO safety guard which securely mounts a PTO guard to a PTO shaft or WAPTO joint yet allows free rotation of the PTO guard relative to the PTO shaft, PTO joint, or WAPTO joint.

According to the invention, there is provided: a safety guard support for a power take off shaft, the safety guard support comprising: a bearing; and a retainer ring, wherein the bearing and the retainer ring comprise corresponding interlocking formations configured to prevent rotation of the bearing relative the retainer ring about a longitudinal axis.

The prevention of relative movement or rotation between the bearing and retainer ring reduce wear of the components. The corresponding interlocking formations provide a more stable locked position for the safety guard support.

The bearing is annular in shape and may comprise a radial split.

The corresponding formations may be arranged on an internal face of the retainer ring and may be on an outer face of the bearing. The corresponding formations may be a plurality of radially spaced teeth and may be arranged to point along the longitudinal axis.

At least one of the teeth on the bearing may include an aperture for receiving lubricant therethrough.

The aperture allows grease or another lubricant to be administered to the working cface of the plain bearing to prevent wear. The aperture also allows grease to be administered without removing the bearing from a WAPTO component.

At least of the teeth on the bearing may include a groove on an outwardly facing surface for receiving a locking clip.

The corresponding formations may be tapered such that when the bearing and retainer ring are brought into engagement the radial split may be substantially closed.

The bearing may be elastically deformable such that the radial split may be spread to allow the bearing to receive a shaft therethrough.

The corresponding formations may be arranged to interlock such that the retainer ring may be removably secured to the bearing.

The retainer ring may comprise a locking formation for retaining a locking clip received therein.

The retainer ring may comprise a first radial groove for receiving a first bellows. The first bellows act as a cover over rotating components of a PTO.

The retainer ring may comprise a second radial groove for receiving a second bellows.

The retainer ring may comprise a bellows. The retainer ring may compromise a second bellows.

The locking clip may include at least two castellations.

Angular displacement of the locking clip may move the locking clip from an unlocked positon to a locked position.

The retainer ring may have a catch which engages with the locking clip in a locked position and may provide visual indication that the locking clip is in a locked position.

The locking clip may engage the bearing in more than two places when in the locked position.

The locking clip may contact the bearing in 10 to 15 discrete places when in the locked position. The numerous contact points reduce the force required to be borne by any single locking point thereby reducing the risk of component failure.

The locking clip may be captive in the retainer ring when the locking clip is in an unlocked position. Holding the locking clip captive prevents the locking from being lost or else damaged and facilitates easier connection of the safety guard to a PTO.

Other advantages of the invention will be apparent from the following description.

INTRODUCTION TO THE DRAWINGS

Embodiments of the invention will now be described, by way of example only, with reference to the accompanying drawings, in which.

The drawings are provided by way of reference only, and will be acknowledged as not to scale.

SPECIFIC DESCRIPTION OF THE INVENTION

Figure 1:
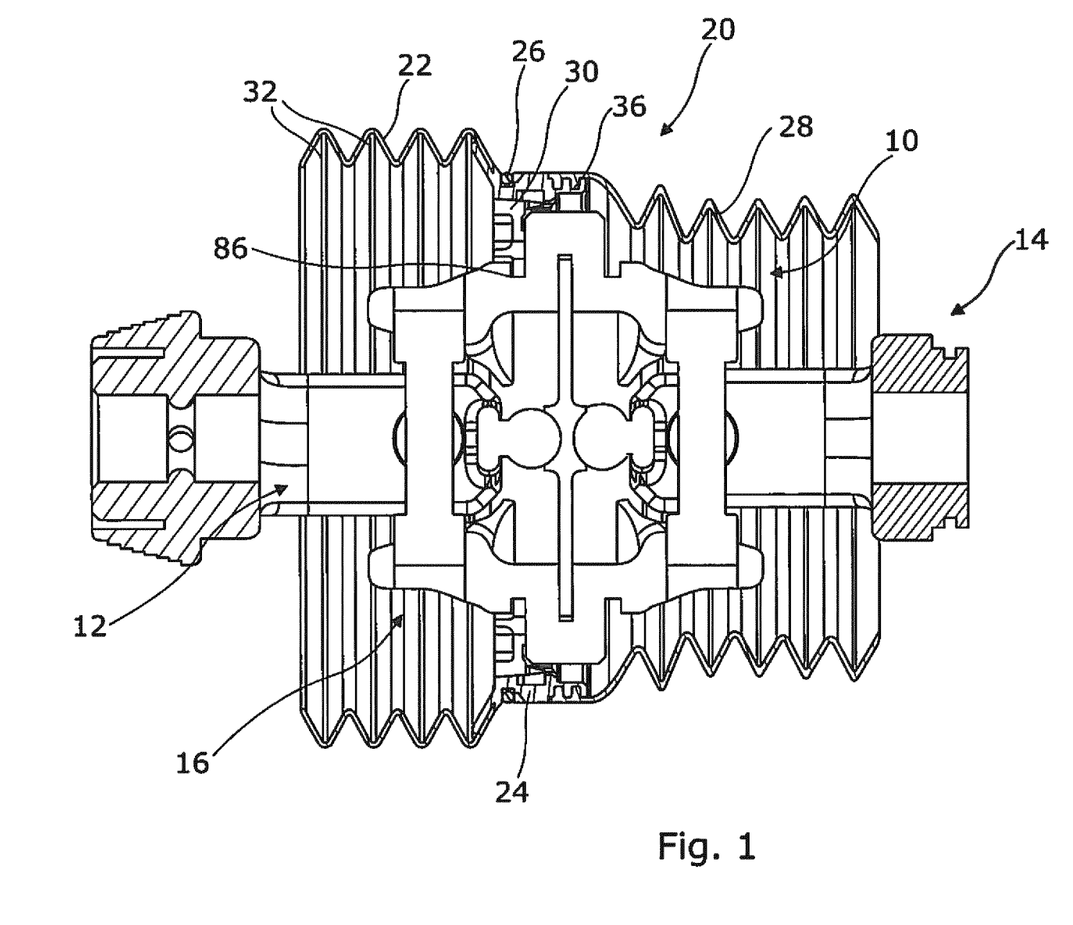
FIG. 1 is a cross section of a safety guard on wide angle joint on a power take off shaft including a safety guard support.
Figure 2:
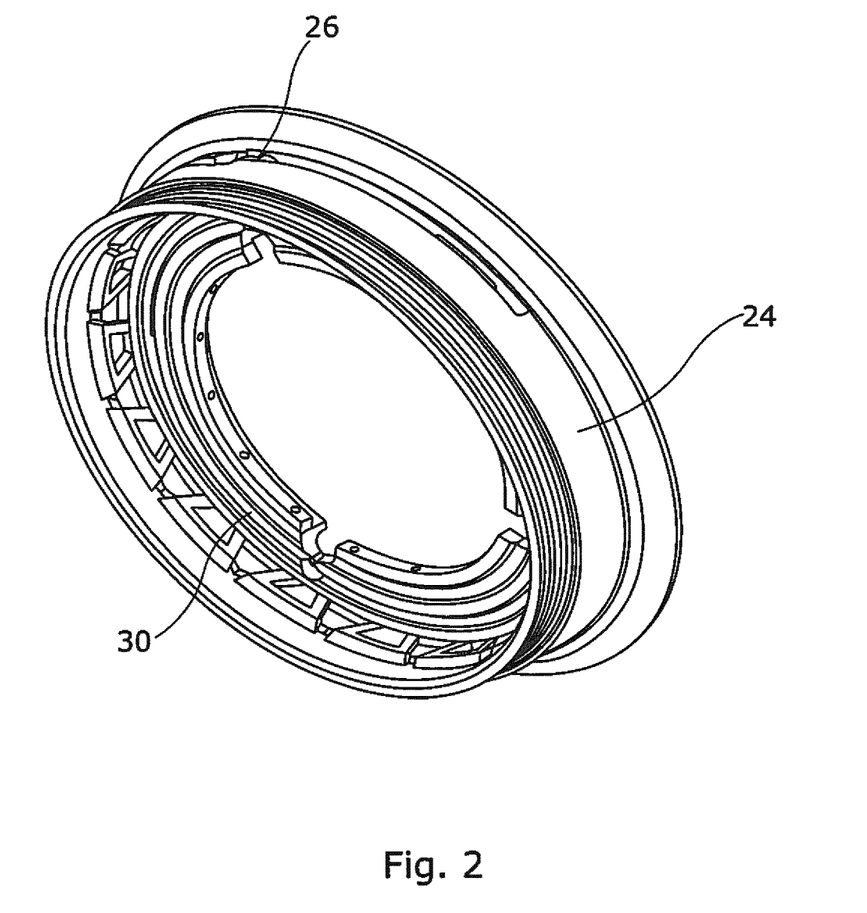
FIG. 2 is a perspective view of the safety guard support of FIG. 1.
Figure 3:
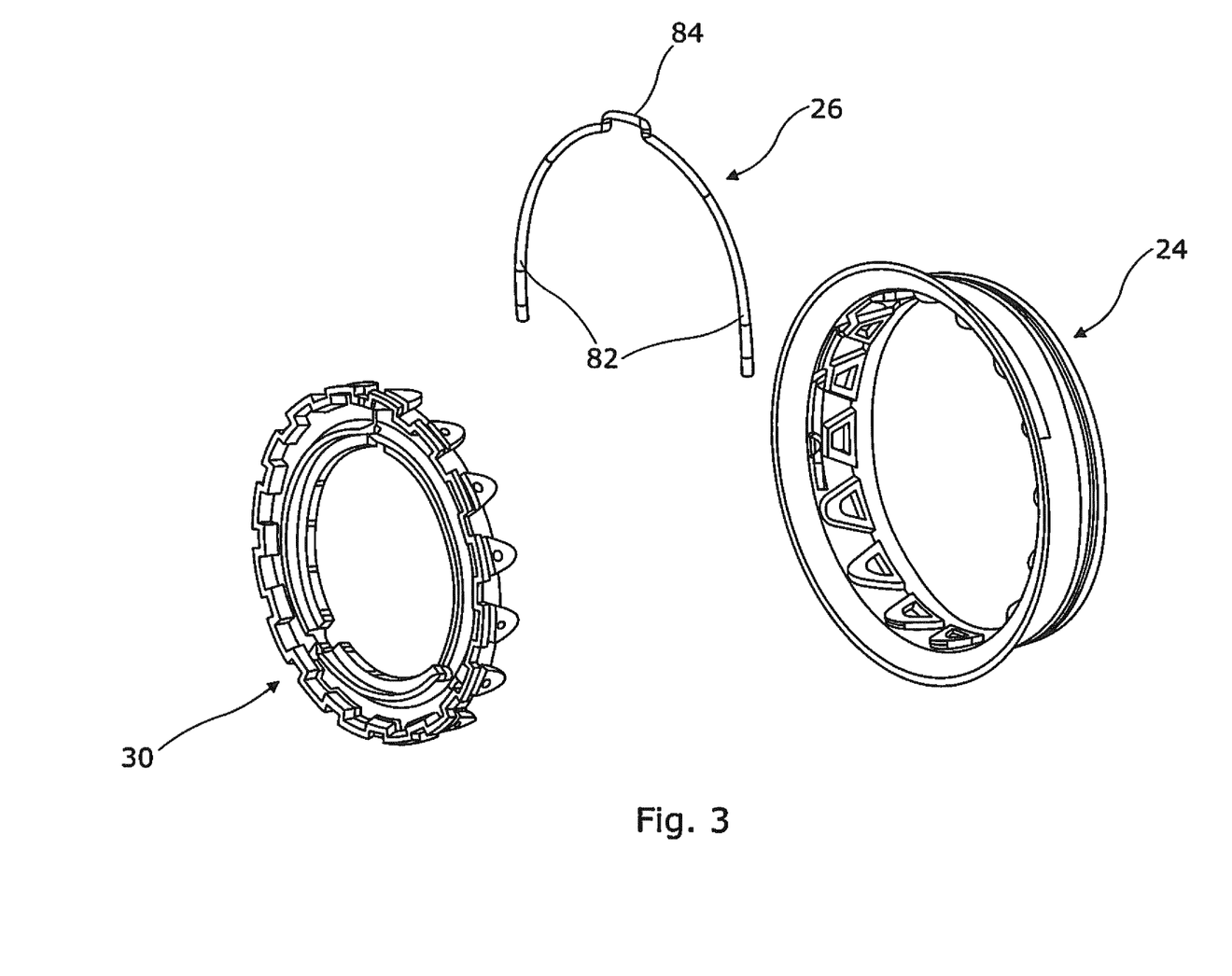
FIG. 3 is an exploded view of the safety guard support of FIG. 2.

In an embodiment of the invention, with reference to FIG. 1 there is shown a cross section through a WAPTO which is indicated generally 10. The WAPTO 10 is of any type known in the art. In this specific example the WAPTO 10 includes and input shaft 12, and output shaft 14 and a WAPTO joint 16.

The input shaft 12 is configured to be in operable communication with a PTO of a tractor (not shown). The input shaft 12 may be directly connected to a PTO of a tractor or other machine or connected to another intermediate shaft which is in turn driven by the PTO of a tractor or other machine.

The output shaft 14 is configured to be in operable communication with an implement (not shown). The output shaft 16 delivers a rotational input to the input of an implement for example a mower as is known in the art.

The WAPTO joint 16 connects the input shaft 12 to the output shaft 14 as is commonplace in the art. The WAPTO joint 16 facilitates the transmission of power from the input shaft 12 to the output shaft 14 thereby allowing the PTO of a tractor or other machine to provide mechanical power to an implement such as a mower. The WAPTO joint 16 allows an the input shaft 12 and output shaft 14 to be longitudinally misaligned and yet still able to transmit rotational forces from a tractors PTO to an implement as is well known in the art.

The WAPTO 10 of FIG. 1 is provided with a safety guard which is indicated generally 20.

In this specific example, the safety guard 20 comprises a first bellows 22, a retainer ring 24, locking clip 26, a second bellows 28 and a bearing 30.

The first bellows 22 is tube like and has a number of circumferential corrugations 32. The circumferential corrugations 32 allow the first bellows 22 to be elastically compressed in a longitudinal direction.

The second bellows 28 is also tube like and has a number of circumferential corrugations 34. The circumferential corrugations 34 allow the second bellows 28 to be elastically compressed in a longitudinal direction. The second bellows 28 includes a number of annular ridges 36 which are positioned proximate to an end of the second bellows 28 and on an inner face of the second bellows 28.

Figure 4:
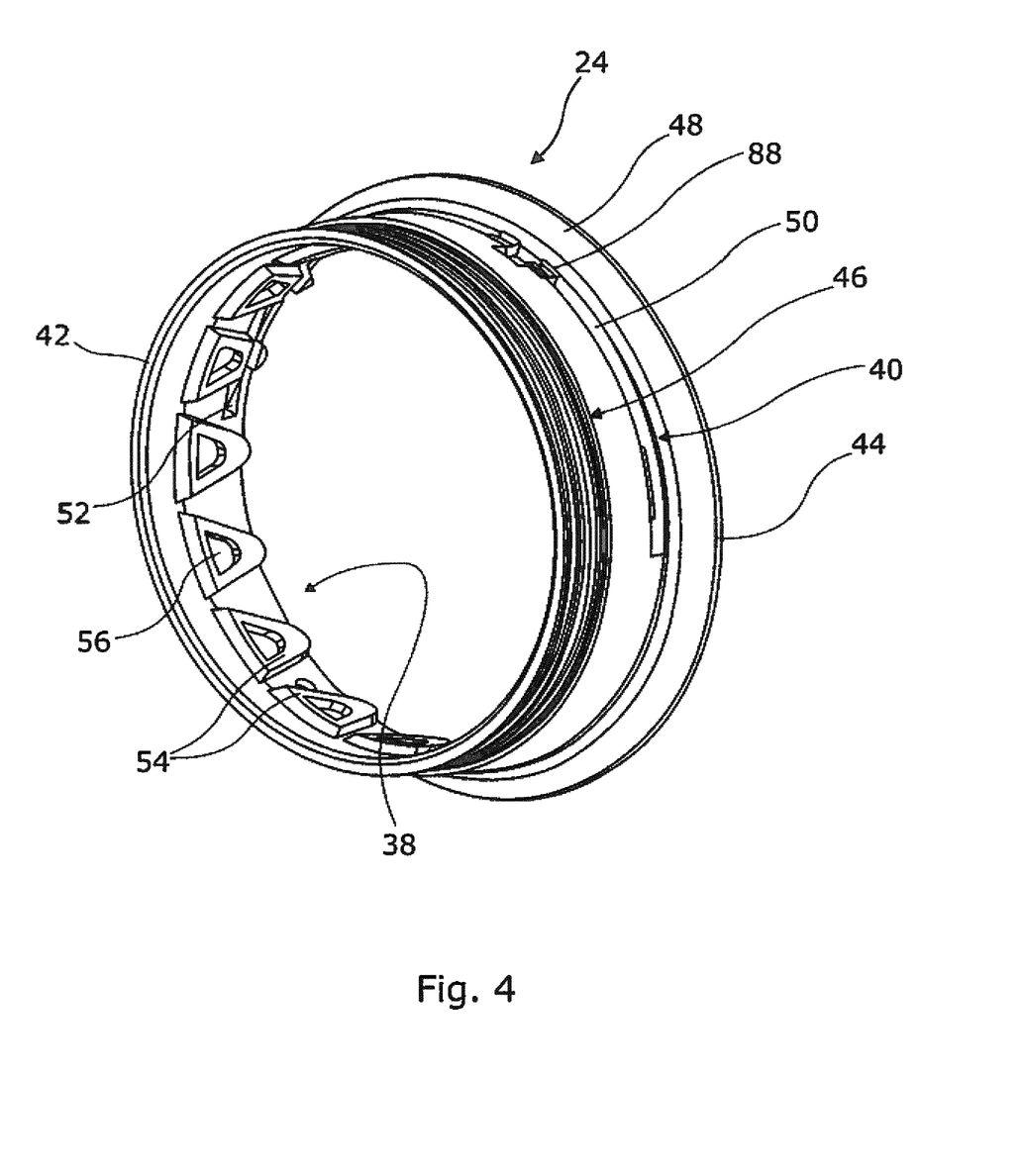
FIG. 4 is a perspective view of the retainer ring of the safety guard support.

The retainer ring 24 is best seen in FIG. 4. The retainer ring 24 is generally cylindrical in shape and comprises an inner face 38, an outer face 40, and extends from a first end 42 to a second end 44.

The retainer ring 24 includes a number of annular grooves 46 on the outer face 40 which are positioned proximate the first end 42. The annular grooves 46 correlate with the annular ridges 36 to retain the second bellows 28 on the retainer ring 24.

The retainer ring further includes a flange 48 which extends from radial outward the outer face 40. The flange 48 cooperates with a circumferential corrugation 32 of the first bellows 22 so that the first bellows 22 can be affixed be affixed to the retainer ring 24. Alternatively one or both of the first and second bellows 22, 28 may be moulded with are otherwise affixed to the retainer ring 24.

The retainer ring 24 has a slot 50 for receiving the locking clip 26 therethrough. The slot 50 is in the form of a groove in the outer face 40 which extends part of the way circumferentially around the retainer ring 24. The groove which forms part of the slot 50 extends all the way through the retainer ring 24 from the outer surface 40 through to the inner surface 38 in the form of hole 52 such that the locking clip 26 can be received therethrough.

Figure 5:
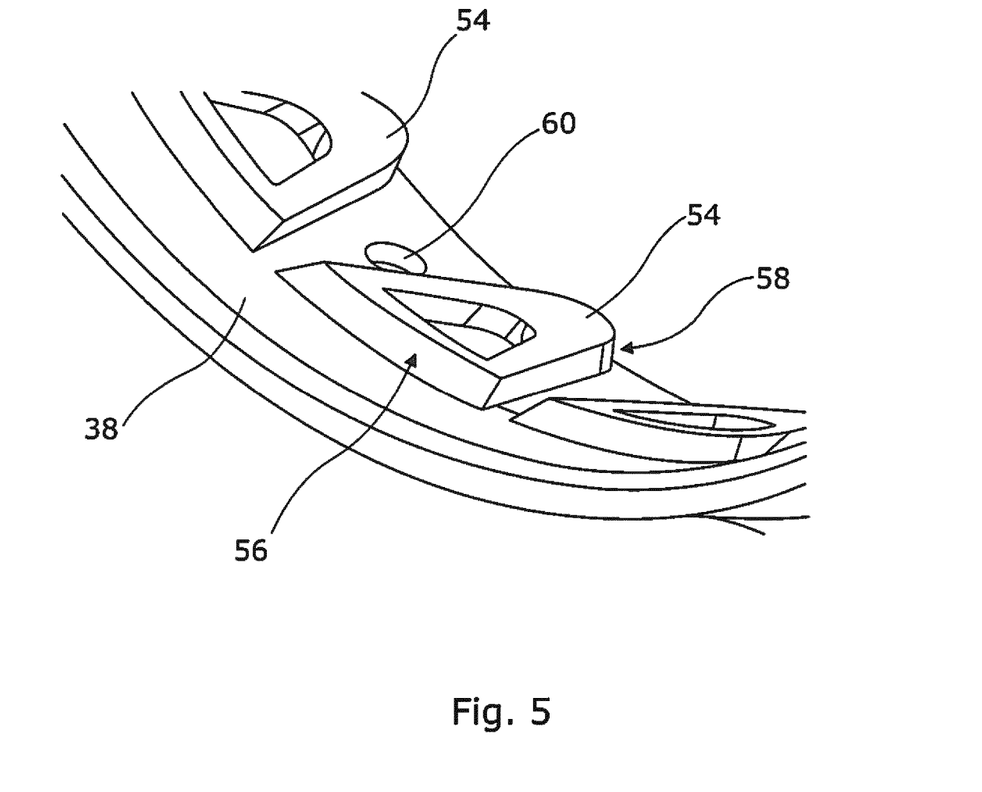
FIG. 5 is a perspective view of one of the corresponding formations of the retainer ring.

A number of formations or teeth 54 are situated on the inner face 38 of the retainer ring 24. In this specific example, each of the teeth 54 have a scallop section 56 which decreases the volume of material required for their construction. With reference to FIG. 5, a portion of the retainer ring 24 is shown in more detail. The teeth 54 form castellations on the internal face 38 of the retainer ring 24. Each of the teeth 54 are generally triangular when viewed in plan, having a base portion 56 and a tip portion 58. Each tooth extends longitudinally away from the first end 42 of the retainer ring 24 along the inner face 38 narrowing towards the tip portion 58. Each of the teeth 54 also tapers in depth from a relatively thin section at the base 56 to a relatively thick section at the tip portion 58.

The retainer ring 24 further includes a grease port 60. The grease port 60 allows grease to be administered to the bearing 30. Grease or else another lubricant can be pumped through the grease port 60 to the bearing 30.

Figure 6:
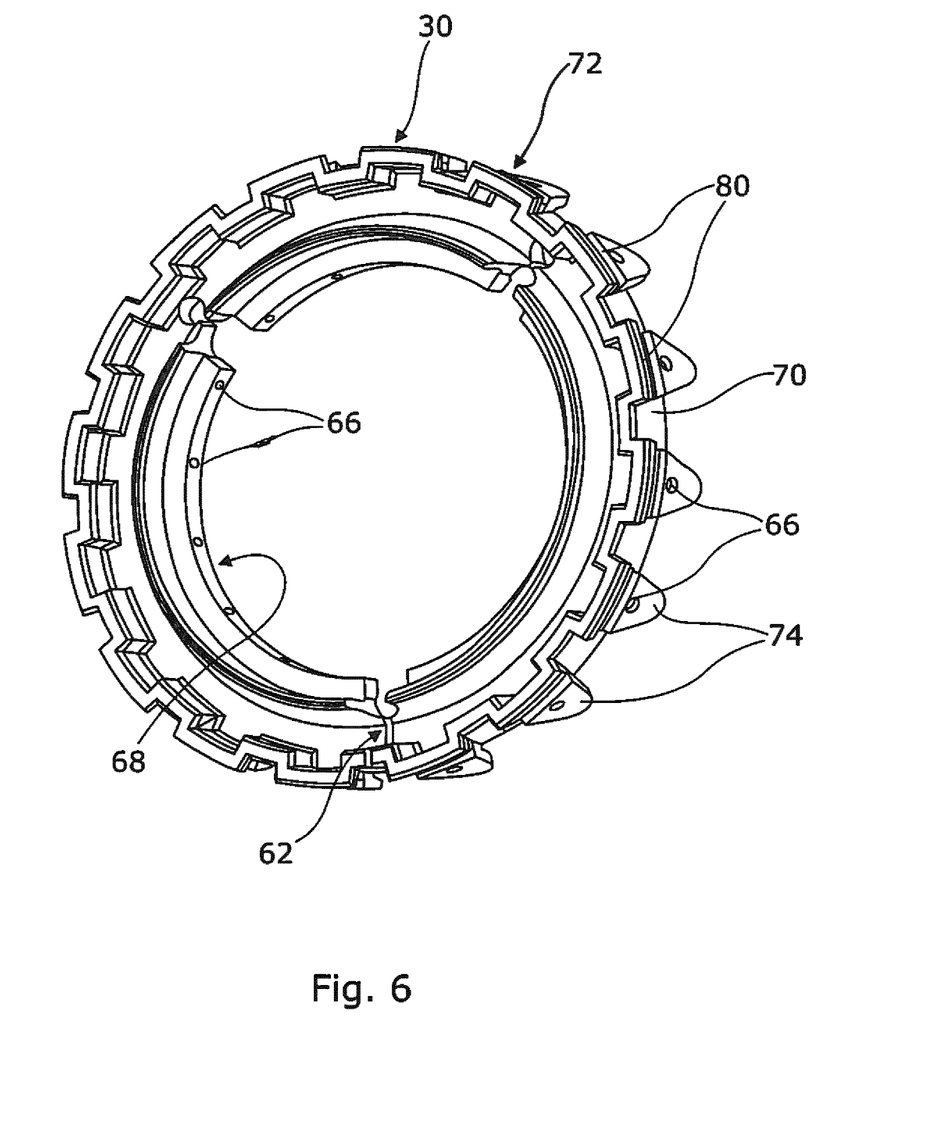
FIG. 6 is a perspective view of the bearing of the safety guard support.
Figure 7:
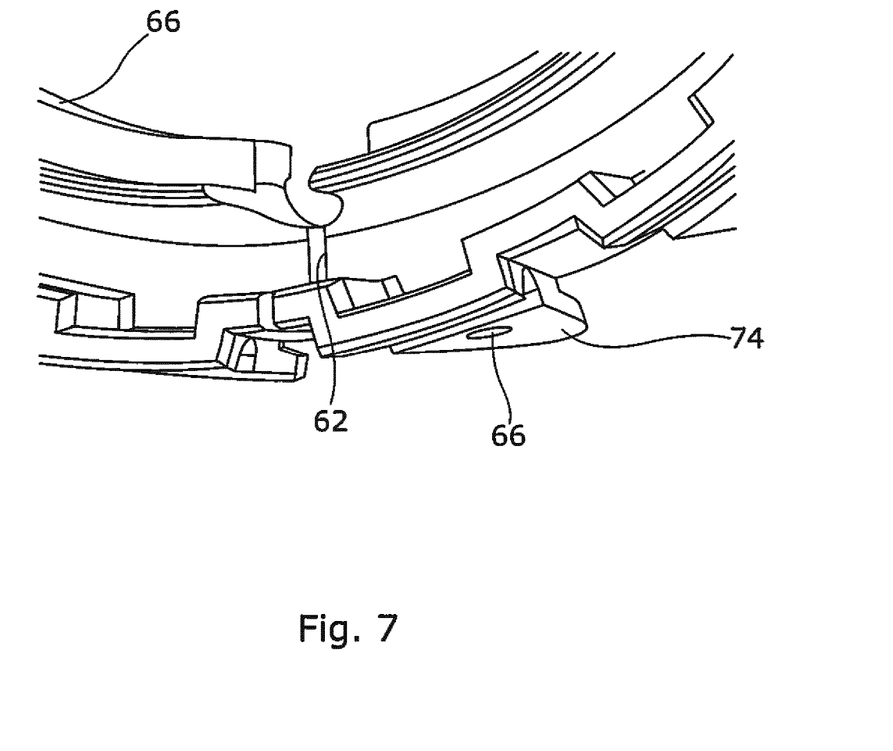
FIG. 7 is a perspective view of one of the corresponding formations of the bearing.

The bearing 30 comprises a radial slit 62, a plurality of conduits 66, an inside surface 68, an outside surface 70, a body 72 and a number of formations or teeth 74. The teeth 74 each comprise a root portion 76, nose portion 78 and a clip groove 80. Each of the teeth 74 has a narrowing taper from the root portion 76 to the nose portion 78 in both width and depth, that is, the teeth 74 have a wedge like profile which thickens towards the root portion 76.

The bearing 30 is of a conventional annular overall shape and is constructed from a plastic for example nylon. The radial slit 62 allows the bearing to be elastically manipulated such that radial split can be spread apart to allow the bearing 30 to installed onto a WAPTO component. The conduits 66 are each a tube that is orientated substantially radially to the centre of the annular bearing. The conduits 66 provide grease channels such that grease can be fed into the conduits 66 to lubricate the inside surface 68 of the bearing which in use will be in dynamic contact with the surface of a WAPTO component e.g. a shaft or joint component. The teeth 74 are positioned in a regularly spaced formation on the outside surface 70 of the bearing 30. That is, the teeth are arranged in a discontinuous pattern around the periphery of the bearing 30. In this specific example, each of the teeth 74 is arranged such that a conduit 66 extends therethrough. Grease administered to the end of the conduits 66 which opens into is in the teeth 74 can make its way to the opening of the conduits 66 on the inside surface 68 of the bearing 30 since each of the conduits 66 passes thought a tooth 74 and the entire body 72 of the bearing 30.

Figure 8:
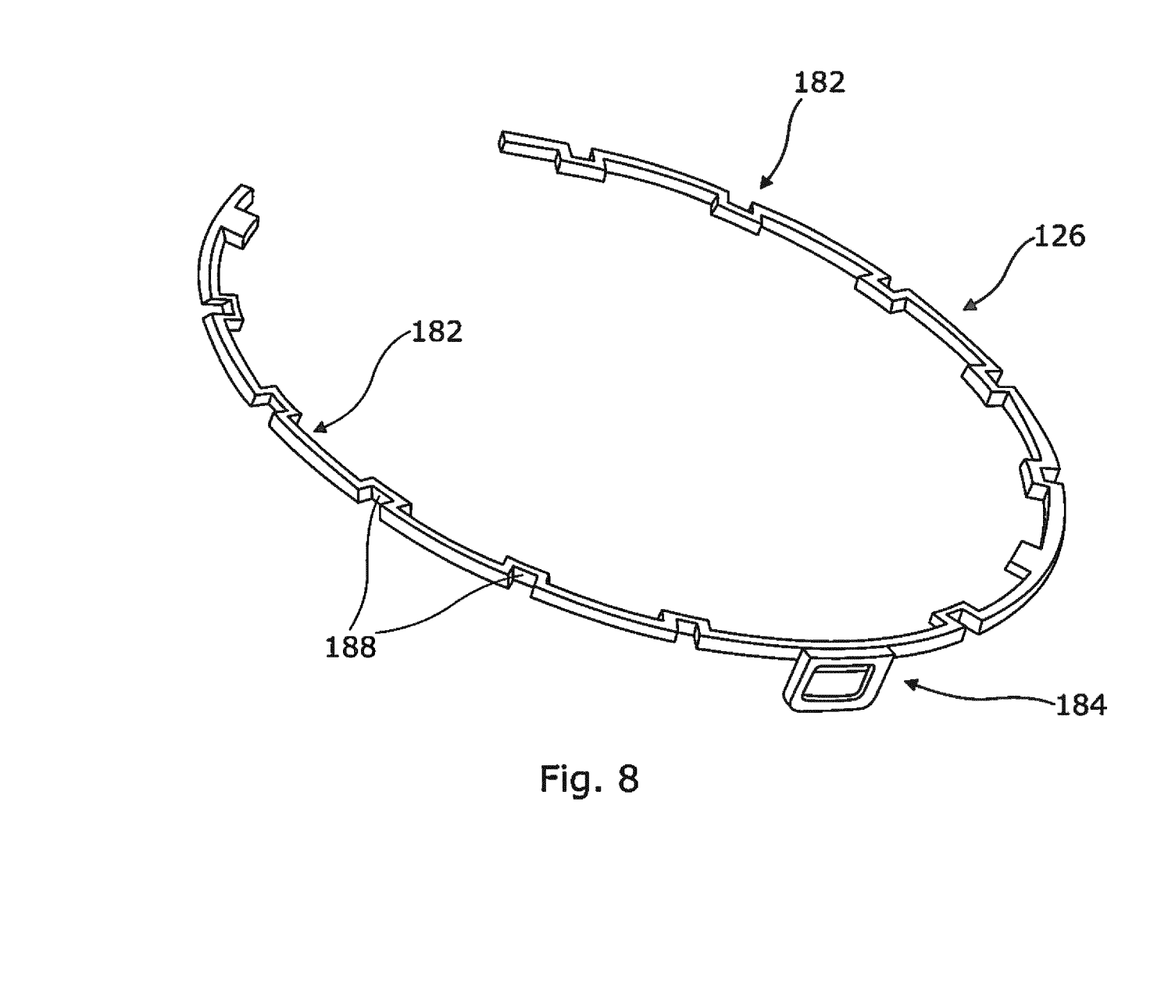
FIG. 8 is a perspective view of a locking clip according to the invention.
Figure 9:
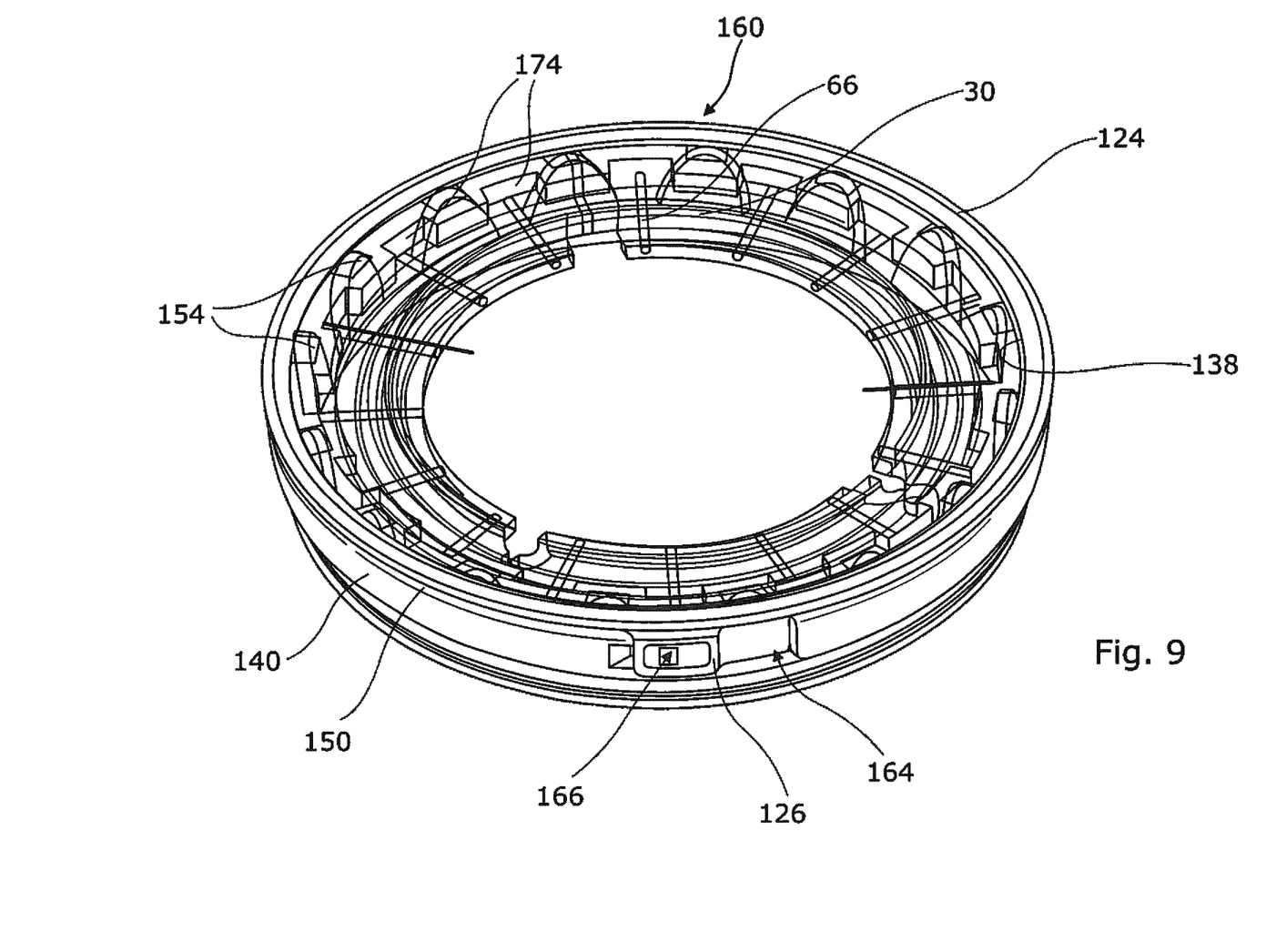
FIG. 9 is a perspective view of a safety guard according to the invention in a locked position.

The locking clip 26 in this embodiment is a U-shaped wire clip. The locking clip 26 comprises a pair of legs 82 and a removal notch 84.

In use, firstly the bearing 30 is installed onto a WAPTO component, in this embodiment, the bearing 30 is fitted onto a WAPTO joint 16. The portion of the body 72 of the bearing 30 which is proximate to the inside surface 68 is received in a recess 86 on the WAPTO joint 16. The bearing 30 is prevented from moving longitudinally since it is retained by the recess 86. The bearing 30 can however rotate freely in the recess 86 about the longitudinal axis of the WAPTO joint 16.

Next the first bellows 22 and the second bellows 28 are installed onto the retainer ring 24. The first bellows 22 is retained on the retainer ring 24 by the flange 48 and the second bellow 28 is retained on the retainer ring 24 by the snap fitting of the annular ridges 236 into the annular grooves 46 in a conventional manner. The retainer ring 24 including the bellows 22, 28 can then be positioned onto the WAPTO, receiving the input shaft 12, the output shaft 14 and the WAPTO joint 16 therethrough.

To secure the retainer ring in position relative to the bearing 30 the teeth 74 of the retainer ring 24 must be brought into intermeshing relationship with the teeth 54 of the bearing 30. The teeth 54, 74 are so shaped that spacing between the teeth 54, 74 mesh together until the plane of the slot 50 is in the same plane as the clip groove 80. The interdigitated relationship of the teeth 54, 74 prevent relative rotation of the bearing 30 and the retainer ring 24. The wedge like taper of the teeth 54, 74 and the relative dimensioning of the retainer ring 24 and the bearing 30 cause the radial slit 62 to be substantially closed as the retainer ring 24 is pressed into engagement with the bearing 30. This occurs because the outer diameter of the bearing 30 is oversized when the radial split 62 is open when compared to the internal diameter of the retainer ring 24.

To secure the retainer ring 24 longitudinally relative to the bearing 30, the locking clip 26 is inserted into the slot 50. The legs 82 protrude toward the centre of the bearing 30 and are received in the clip groove 80 in the teeth 74 of the bearing 30. Inserting the locking clip 26 like this acts and an interference member, thereby preventing unwanted separation of the bearing 30 and the retainer ring 24 when the safety guard 20 is in use. To ensure that the locking clip 26 does not move out of position unexpectedly it is held in position by a retaining formation 88. The retaining formation 88 receives the removal notch 84 portion of the locking clip 26 in a snap fit engagement.

Each of the teeth 74 has a conduit 66 for receiving grease therethrough. One of the teeth 74 will be received in the space between the two teeth 54 which neighbour the grease port 60 on the retainer ring 24. Because of this design, one of the conduits 66 will always be in alignment with the grease port 66 regardless of the relative axial orientation of the bearing 30 and the retainer ring 24. Grease can thus be applied to the bearing 30 inside surface 68 via the conduits 66 and grease port 60 without removing the retainer ring 24 from engagement of with the bearing 30.

In a further embodiment of the invention, a different type of locking clip arrangement is used. In this embodiment the bearing 30 is substantially the same as previously described. In this embodiment, a locking clip 126 is different to the locking clip 26 and a retainer ring 124 differs slightly to the previously described retainer ring 24. All the features other than the locking clip 126 and how the locking clip 126 is retained in the retainer ring 124 are as previously described in the aforementioned embodiment.

With reference to FIGS. 9 to 12, the retainer ring 124 is generally cylindrical in shape and comprises an inner face 138, an outer face 140, and extends from a first end 142 to a second end 144.

The retainer ring 124 includes a number of annular grooves 146 on the outer face 140 which are positioned proximate the first end 142. The annular grooves 146 correlate with the annular ridges 36 to retain the second bellows 28 on the retainer ring 124.

The retainer ring further includes a flange 148 which extends from radial outward the outer face 140. The flange 148 cooperates with a circumferential corrugation 32 of the first bellows 22 such that the first bellows 22 can be affixed be affixed to the retainer ring 124.

A number of formations or teeth 154 are situated on the inner face 138 of the retainer ring 124. The teeth 154 form castellations of discontinuous raised sections on the internal face 138 of the retainer ring 124. Each of the teeth 154 are generally triangular when viewed in plan, having a base portion 156 and a tip portion 158. Each tooth extends longitudinally away from the first end 142 of the retainer ring 124 along the inner face 138 narrowing towards the tip portion 158. Each of the teeth 154 also tapers in depth from a relatively thin section at the base 156 to a relatively thick section at the tip portion 158.

The retainer ring 124 has a slot 150 for receiving the locking clip 126. The slot 150 is in the form of a groove in the outer face 140 which extends around the entire circumference around the retainer ring 124. The slot 150 extends from the outer face 140 all the way through the retainer ring 24 to the inner face 138. The slot 150 substantially bisects the retainer ring 124 but does not bisect the teeth 154. The teeth 154 support the two parts of the retainer ring 124. The retainer ring also includes a locking tab or catch 166. The locking tab or catch 166 is in the form of a raised portion of the retainer ring 124 outer face which resides in a recess 164 in the outer face 140 and acts as a catch 166 to prevent rotational motion of the locking clip 126 relative to the retainer ring 124. In an alternative arrangement that is not shown, the slot 150 may extend partially around the outer face and partially around the inner face such that the lower portion of the locking clip 126 is received inside the retainer ring 124.

The retainer ring 124 further includes a grease port 160 (not shown). The grease port 160 allows grease to be administered to the bearing 30. Grease or else another lubricant can be pumped through the grease port 160 and through conduits 66 to the bearing 30.

The locking clip 126 is a castellated arcuate member comprising castellations 188, a locking tab 184 and legs 182 which extend from the locking tab 184. The locking clip 126 is configured to be received in the slot 150 of the retainer ring 124 in such a manner that only axial rotation of the locking clip 126 and retainer ring 124 is permitted.

Figure 10:
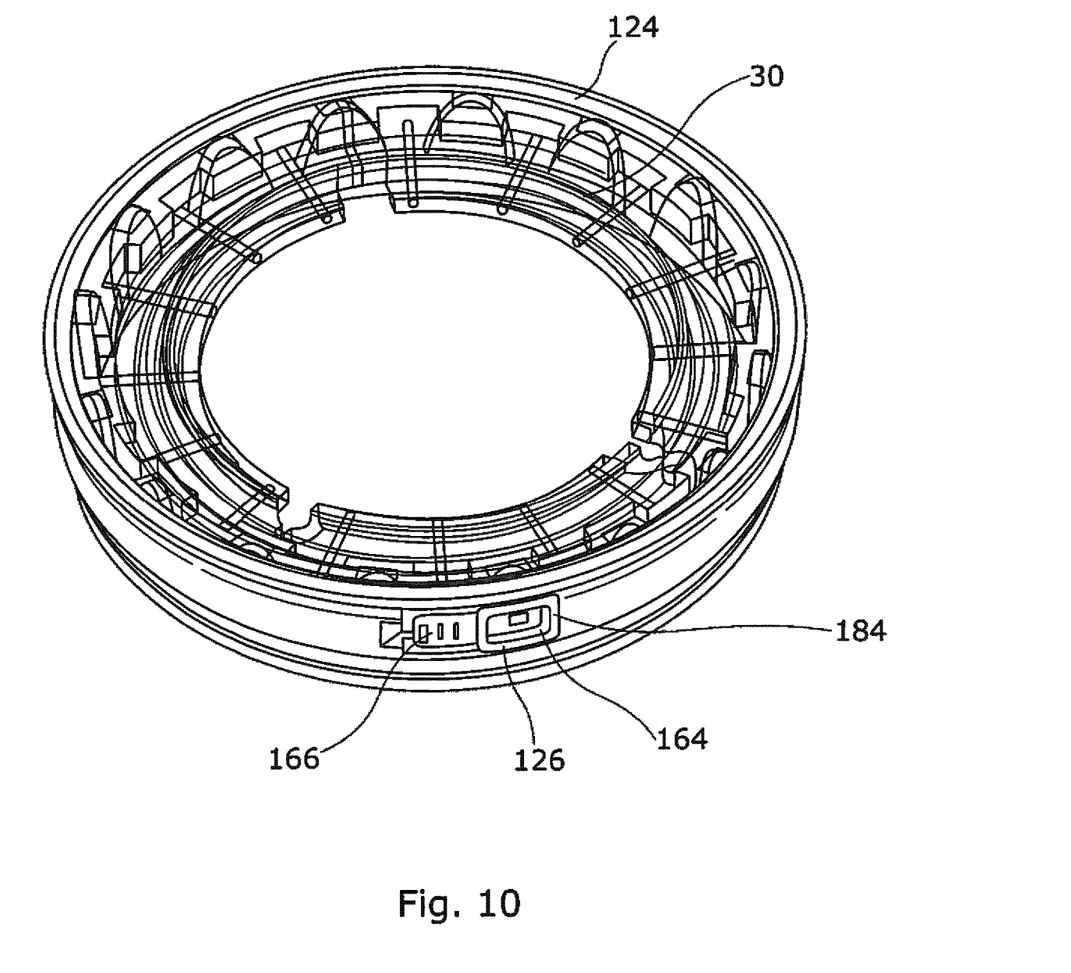
FIG. 10 is a perspective view of a safety guard according to the invention in an unlocked position.
Figure 11:
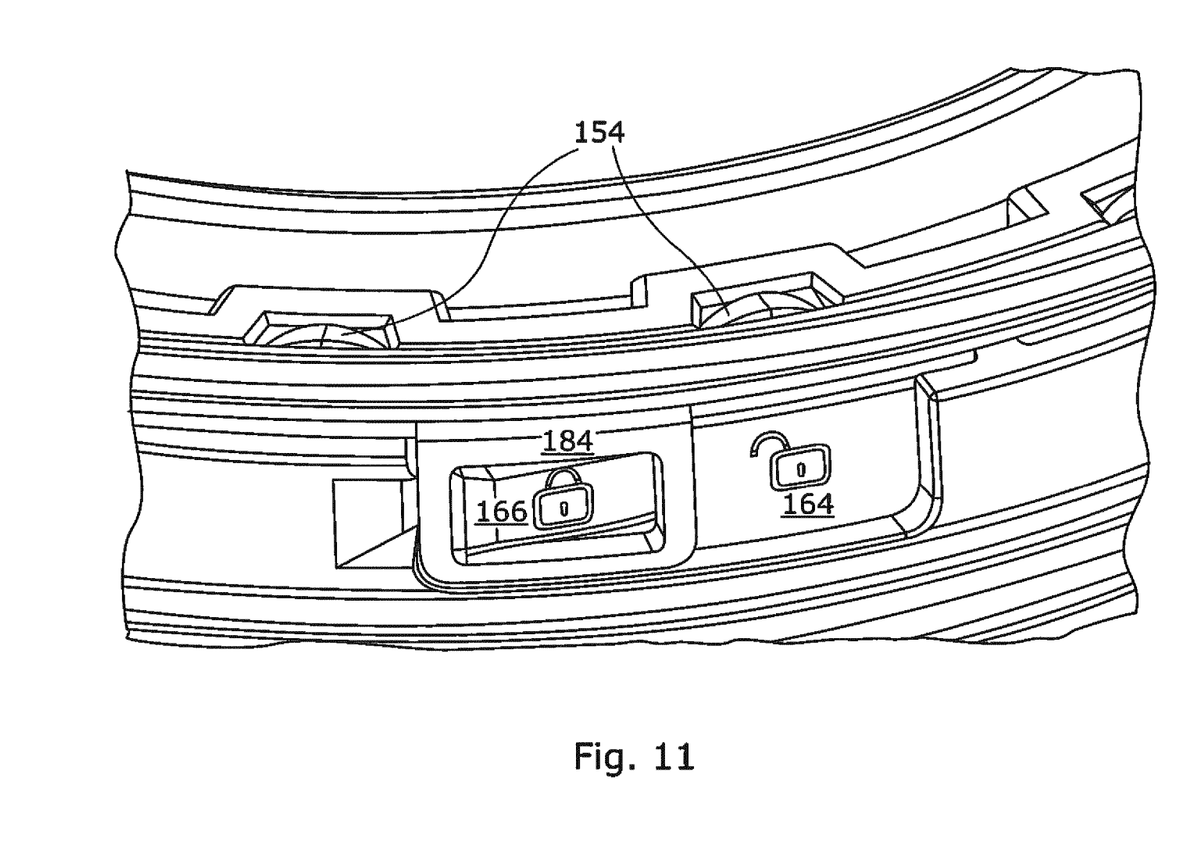
FIG. 11 is a detail view of FIG. 9.
Figure 12:
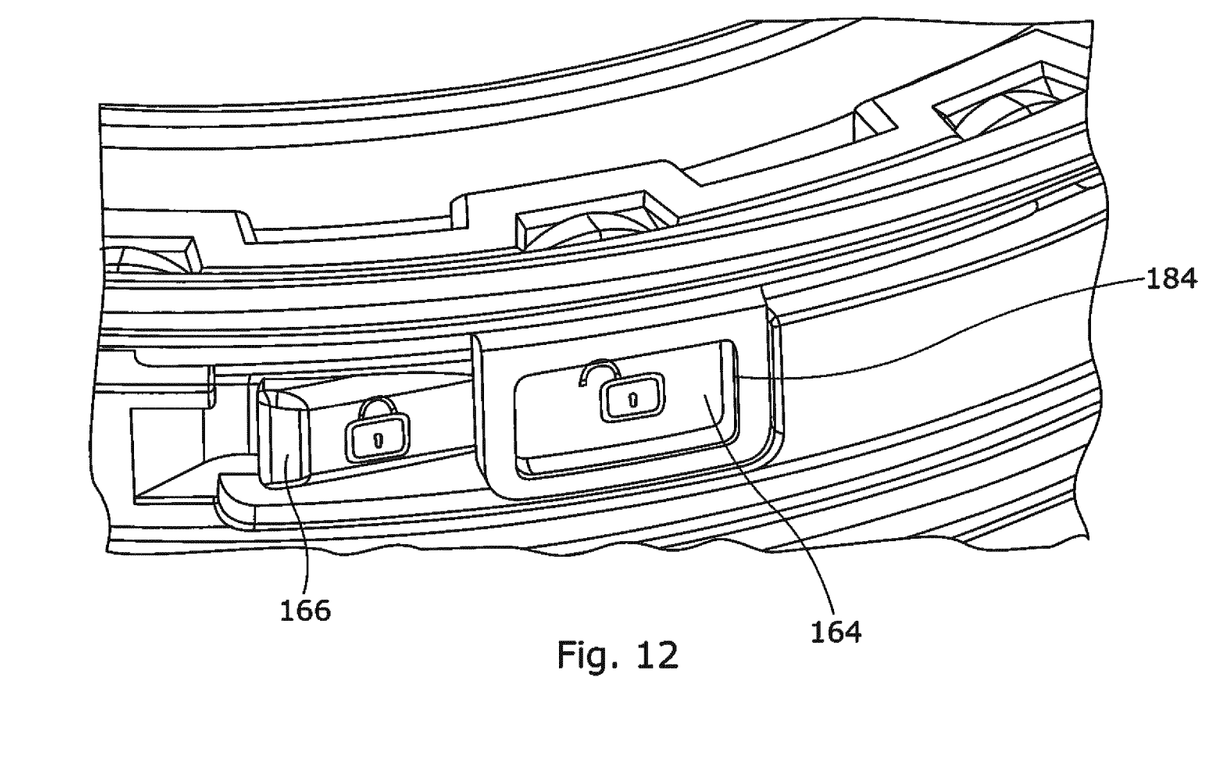
FIG. 12 is a detail view of FIG. 10.

In use, to lock the retainer ring 124 to the bearing 30, the locking clip 126 must be rotated axially relative to the retainer ring 124. The locking clip 126 has two positions in which it can reside: a locked position as seen in FIG. 11 and an unlocked position as is seen in FIG. 10. The locking clip 126 is moved from the locked position wherein the locking tab 184 is residing in the recess 164, to a position where the locking tab 184 is situated in engagement with the catch 166.

It will be understood that when the locking clip 126 is in the unlocked position, each of the castellations 188 are in alignment with the teeth 154 of the retainer ring 124. As the castellations 188 in this position do not extend beyond the outer profile of each of the teeth 154, the retainer ring 124 is able to receive the teeth 74 of the bearing 30 in the spaces between the teeth 174 in meshing engagement. The locking clip 126 is configured to be retained in the retainer ring 124 even when the locking clip is in the unlocked position by the dimensioning of the respective components.

In the locked position, the locking clip 126 has been rotated relative to the retainer ring 124, consequently the locking tab 184 has moved from the recess 164 and into engagement with the catch 166. Each of the castellations 188 of the locking clip 126 have been angularly displaced so that they are no longer in alignment with the teeth 154. The castellations 188 now reside between the teeth 154 of the retainer ring 124 and are in alignment and thus in engagement with the teeth 74 of the bearing. Specifically the castellations 188 of the retainer ring 124 are configured to be received in the clip groove 80 of the teeth 74 of the bearing 30 thereby preventing longitudinal separation of the retainer ring 124 and the bearing 30 when the locking clip 126 is in the locked position.

Although described in relation to a PTO shaft of an agricultural machine, it should be understood that the advantages of the invention can be delivered for a safety guard for other rotational shafts in other applications.

The invention claimed is:

1. A safety guard support for a power take off shaft, the safety guard support comprising:
   a bearing; and
   a retainer ring,
   wherein the bearing and the retainer ring comprise corresponding interlocking formations configured to prevent rotation of the bearing relative the retainer ring about a longitudinal axis, wherein the corresponding formations are a plurality of radially spaced teeth, wherein at least one of the teeth on the bearing comprises a groove on an outwardly facing surface for receiving a locking clip.

2. The safety guard support according to claim 1 wherein the bearing is annular in shape and comprises a radial split.

3. The safety guard support according to claim 2 wherein the corresponding formations are tapered such that when the bearing and the retainer ring are brought into engagement the radial split is substantially closed.

4. The safety guard support of claim 2 wherein the bearing is elastically deformable such that the radial split may be spread to allow the bearing to receive a shaft therethrough.

5. The safety guard support according to claim 1 wherein the corresponding formations are arranged on an internal face of the retainer ring and on an outer face of the bearing.

6. The safety guard support according to claim 1 wherein the teeth are arranged to point along the longitudinal axis.

7. The safety guard support according to claim 1 wherein at least one of the teeth on the bearing includes an aperture for receiving lubricant therethrough.

8. The safety guard support of claim 1, wherein the retainer ring comprises a first radial groove for receiving a first bellows.

9. The safety guard support of claim 8, wherein the retainer ring comprises a second radial groove for receiving a second bellows.

10. The safety guard support according to claim 1, wherein the locking clip includes at least two castellations.

11. The safety guard support according to claim 1, wherein angular displacement of the locking clip moves the locking clip from an unlocked position to a locked position.

12. The safety guard support according to claim 1, wherein the retainer ring has a catch which engages with the locking clip in a locked position and provides visual indication that the locking clip is in a locked position.

13. The safety guard support according to claim 1, wherein the locking clip engages the bearing in more than two places when in a locked position.

14. The safety guard support according to claim 13 wherein the locking clip contacts the bearing in 10 to 15 discrete places when in the locked position.

15. The safety guard support according to claim 1, wherein the locking clip is captive in the retainer ring when the locking clip is in an unlocked position.

16. A safety guard support for a power take off shaft, the safety guard support comprising:
   a bearing;
   a retainer ring, wherein the bearing and the retainer ring comprise corresponding interlocking formations configured to prevent rotation of the bearing relative the retainer ring about a longitudinal axis, wherein the corresponding formations comprise a plurality of circumferentially spaced teeth arranged on a radially inwardly directed face of the retainer ring and on an opposing radially outwardly directed face of the bearing, and
   a locking clip for securing the retaining ring and the bearing longitudinally relative to one another in an assembled condition, the teeth on the bearing including a groove on a radially outwardly facing surface for receiving the locking clip when the locking clip is in a locked position.

17. The safety guard support according to claim 16, wherein the teeth are generally triangular when viewed in plan, narrowing from a base to a tip portion in a direction parallel to the longitudinal axis, the teeth on the retaining ring and the teeth on the bearing narrowing in opposite directions.

18. The safety guard support according to claim 17 wherein the corresponding formations are tapered such that when the bearing and retainer ring are brought into engagement the radial split is substantially closed.

19. The safety guard support according to claim 17 wherein the locking clip contacts the bearing in 10 to 15 discrete places when in the locked position.

20. The safety guard support according to claim 16, wherein the locking clip engages the bearing in more than two places when in a locked position.

* * * * *